Oct. 30, 1945.   J. D. REARDON ET AL   2,388,077
LENS SYSTEM
Filed Aug. 25, 1942

INVENTOR.
NATHAN GOTTLIEB
JOSEPH D. REARDON
BY
ATTORNEY

Patented Oct. 30, 1945

2,388,077

UNITED STATES PATENT OFFICE 2,388,077

LENS SYSTEM

Joseph D. Reardon and Nathan Gottlieb, Buffalo, N. Y., assignors, by mesne assignments, to American Optical Company, Southbridge, Mass., a voluntary association Application August 25, 1942, Serial No. 456,301

3 Claims. (Cl. 88—57)

This invention relates to lens systems and more particularly to a lens system suitable for use as an eyepiece in projection measuring instruments or the like.

An object of the present invention is to provide a lens system which will transmit a relatively large field of view and which is relatively free from distortion and which is relatively simple and economical to manufacture.

Another object of the invention is to provide a lens system for use in projection systems which allows the objective to be of relatively simple construction.

Another object of the invention is to provide a lens system for use in projection systems which is suitable for lateral color to compensate for correction of lateral color in the objective thereby allowing the use of an objective of relatively simple design and construction.

Other objects and advantages of the invention will be apparent from the following description taken in connection with the accompanying drawing and it will be understood that many changes may be made in the details of construction and arrangement of parts without departing from the spirit of the invention as expressed in the accompanying claims. We therefore, do not wish to be limited to the exact details of construction and arrangement of parts shown and described as the preferred form has been shown by way of illustration only.

Figure 1:
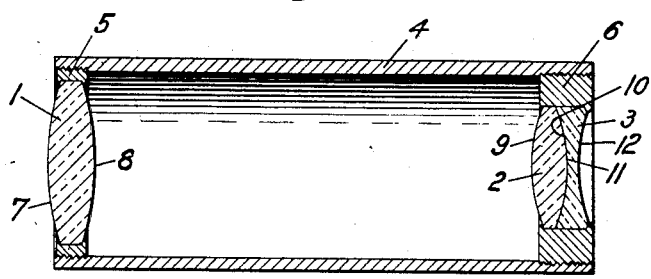
Fig. 1 shows an axial section of a preferred form of lens system embodying the invention.

In the past lens systems employed as eyepieces in projection measuring instruments were systems which had been converted from visual systems.

These systems were not entirely satisfactory for use in projection measuring instruments, and particularly instruments of the reed type, for several reasons. First, the said systems had too much uncorrected lateral color. Second, the distortion was not sufficiently corrected for use at the conjugates of a measuring instrument and, third, most of such systems did not have a sufficiently wide field angle to permit use in a measuring instrument.

It, therefore, is an object of this invention to provide a new and improved lens system for use as an eyepiece in a projection measuring instrument, which system is suitably corrected for lateral color, free from distortion and which has a relatively wide field angle.

Referring more particularly to the drawing:

The optical system comprises a single lens element 1 and a second element in the form of a cemented doublet comprising the elements 2 and 3.

The rear element 1 may be mounted in a ring 5 which may be secured in the lens barrel 4 by providing said ring 5 with a threaded portion adapted to engage a threaded portion on the inner surface of said tube 4.

The front elements 2 and 3 are secured in the ring 6 and this ring 6 may also have a threaded portion secured in engagement with the threaded portion on the inner surface of the tube 4.

The double convex elements 1 and 2 are preferably formed of spectacle crown glass having an index of refraction of 1.523 and the Abbe number thereof is approximately 58.5.

The front element 3 is a double concave element and is preferably of a medium flint glass having an index of refraction of 1.6168 and the Abbe number thereof is approximately 36.6.

The surface 7 of the element 1 has a radius of 26.58 mm. and the surface 8 thereof has a radius of 39.83 mm. The surface 9 of the element 2 has a radius of 7.60 mm. and the surface 10 has a radius of 11.23 mm.

The radius of the surface 11 of the element 3 is 11.23 mm. and the surface 12 thereof has a radius of 42.55 mm.

The separation between the lens elements 1 and 2 is 26.459 mm. This separation is critical and only slight variations from the value given can be tolerated without injuring the performance.

The center thickness of the element 1 is 4.0 mm. and the clear aperture thereof is 17.5 mm. The center thickness of the element 2 is 3.35 mm. and the clear aperture thereof is 7.25 mm.

The center thickness of the element 3 is 0.9 mm. and the clear aperture thereof of 6.00 mm.

The diameter of the element 1 is 18.5 mm. and the diameter of the elements 2 and 3 is 8.0 mm.

The lens system described above is free from distortion, corrected for lateral color and covers a large field. While this system is particularly adapted for projection measuring instruments it may be employed with other projection devices where a lens system having the advantages of the present construction is desired.

Figure 2:
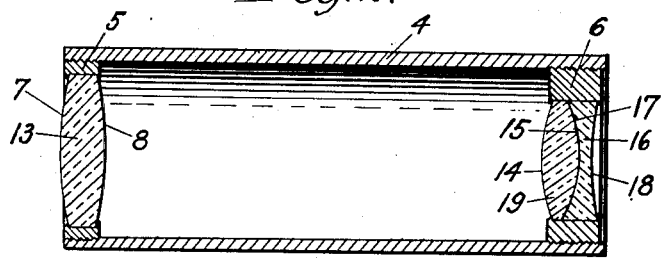
Fig. 2 is a view similar to Fig. 1 but showing a modified form of the invention.

In the form of the invention shown in Fig. 2 the double convex rear lens element 13 is generally similar to the rear element 1 of the system shown in Fig. 1. The double convex element 19 is formed of an extra light flint glass having an index of refraction of 1.528 and the Abbe number thereof is approximately 51.6.

The radius of curvature of the surface 14 of this element is 7.823 mm. and the radius of curvature of the surface 15 of this element is 6.916 mm. and the center thickness of said element is 3.35 mm.

The double concave front element 16 is formed of a dense flint glass having an index of refraction of 1.648 and the Abbe number thereof is approximately 33.8. The radius of curvature of the surface 17 of this element is 6.916 mm. and the radius of curvature of the surface 18 is 195.67 mm. and the center thickness of said element is 0.9 mm.

The diameter of said element 13 is approximately 18.5 mm. while the diameter of both the elements 19 and 16 is 7.0 mm.

The clear aperture of the element 13 is 17.5 mm., the clear aperture of the element 19 is 6.5 mm. and the clear aperture of the element 16 is 5.5 mm.

The separation between the elements 13 and 19 is 26.237 mm.

The system shown in Fig. 2 may be mounted in a mount in a manner similar to Fig. 1.

The elements designated as front elements are those farthest away from the observer while those elements designated as rear elements are those nearest to the observer.

From the above it will be seen that we have provided simple, efficient and economical means for obtaining the objects and advantages of the invention.

Having described our invention, we claim:

1. A lens system of the character described, comprising a front doublet member consisting of a double concave front element of medium flint glass having an index of refraction of approximately 1.617, and an Abbe number of approximately 36.6, said element having an axial thickness of approximately 0.9 mm. and the front surface thereof having a radius of approximately 42.5 mm. and the rear surface thereof having a radius of approximately 11.2 mm., and a double convex rear element of spectacle crown glass having an index of refraction of approximately 1.52, an Abbe number of approximately 58.5, an axial thickness of approximately 3.3 mm, and the front surface thereof having a radius of approximately 11.2 mm. and the rear surface thereof having a radius of approximately 7.6 mm., and a rear member consisting of a single double convex element of spectacle crown glass having an index of refraction of approximately 1.52 and an Abbe number of approximately 58.5, said element having an axial thickness of approximately 4.0 mm. and the front surface thereof having a radius of approximately 39.8 mm. and the rear surface thereof having a radius of approximately 26.5 mm., the separation between said members being approximately 26 mm., the lens system being formed according to the above computations or a ratio thereof.

2. A lens system of the character described, comprising a front doublet member consisting of a double concave front element of dense flint glass having an index of refraction of approximately 1.64 and an Abbe number of approximately 33.8, said element having an axial thickness of approximately .9 mm. and the front surface thereof having a radius of approximately 195.6 mm. and the rear surface thereof having a radius of approximately 6.9 mm., and a double convex rear element of extra light flint glass having an index of refraction of approximately 1.52 and an Abbe number of approximately 51.6, the front surface thereof having a radius of approximately 6.9 mm. and the rear surface thereof having a radius of approximately 7.8 mm., the axial thickness thereof being approximately 3.3 mm., and a rear member consisting of a single double convex element of spectacle crown glass having an index of refraction of approximately 1.52 and an Abbe number of approximately 58.5, said element having an axial thickness of approximately 4.0 mm. and the front surface thereof having a radius of approximately 39.8 mm. and the rear surface thereof having a radius of approximately 26.5 mm., the separation between said members being approximately 26 mm., the lens system being formed according to the above computations or a ratio thereof.

3. An eyepiece substantially free of distortion comprising a rear double convex lens of spectacle crown glass having an index of refraction of approximately 1.52 and an Abbe number of approximately 58.5, said element having an axial thickness of approximately 4.0 mm. and the front surface thereof having a radius of approximately 39.8 mm. and the rear surface thereof having a radius of approximately 26.5 mm., said rear lens being separated by approximately 26 mm. from a front doublet consisting of a double concave front element of flint glass and a double convex rear element cemented thereto, the rear face of said biconvex element having a radius of approximately 7.6 mm., the index of refraction of said biconcave member being substantially higher than the index of refraction of said biconvex element and the Abbe number of the glass of said biconcave member being substantially lower than the Abbe number of the glass of said biconvex element, said double convex lens cooperating with said doublet to afford compensation for undercorrection of lateral color in a lens system with which said eyepiece is used.

NATHAN GOTTLIEB.
JOSEPH D. REARDON.